(12) United States Patent
Sladecek

(10) Patent No.: US 11,375,850 B2
(45) Date of Patent: Jul. 5, 2022

(54) AIR-BASED FRYER

(71) Applicant: KONINKLIJKE PHILIPS N.V., Eindhoven (NL)

(72) Inventor: Marcel Sladecek, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 143 days.

(21) Appl. No.: 16/300,644

(22) PCT Filed: May 16, 2017

(86) PCT No.: PCT/EP2017/061679
§ 371 (c)(1),
(2) Date: Nov. 12, 2018

(87) PCT Pub. No.: WO2017/202641
PCT Pub. Date: Nov. 30, 2017

(65) Prior Publication Data
US 2019/0142217 A1    May 16, 2019

(30) Foreign Application Priority Data

May 24, 2016 (CN) .......................... 201620480320.6

(51) Int. Cl.
  *A47J 37/06*   (2006.01)
  *A21B 1/26*    (2006.01)
  *A47J 39/00*   (2006.01)

(52) U.S. Cl.
  CPC ............. *A47J 37/0641* (2013.01); *A21B 1/26* (2013.01); *A47J 39/003* (2013.01)

(58) Field of Classification Search
  CPC ............................... A47J 37/0641; A21B 1/26
  (Continued)

(56) References Cited

U.S. PATENT DOCUMENTS

| | | | |
|---|---|---|---|
| 5,558,010 A * | 9/1996 | Shelton | A21C 13/00 126/21 A |
| 2004/0035845 A1* | 2/2004 | Moon | A47J 37/0623 219/400 |

(Continued)

FOREIGN PATENT DOCUMENTS

| | | |
|---|---|---|
| CN | 101119664 A | 2/2008 |
| CN | 101672492 A | 3/2010 |

(Continued)

OTHER PUBLICATIONS https://en.wikipedia.org/wiki/Smoke_point.

*Primary Examiner* — Reginald Alexander
(74) *Attorney, Agent, or Firm* — Schott, P.C.

(57) ABSTRACT

Embodiments of the present disclosure relate to an air-based fryer, comprising: a food preparation chamber (1); a heating device (3); an airflow generating device (2) configured to enable air heated by the heating device (3) to form an airflow to heat food in the food preparation chamber (1); a first temperature sensing device (4) located nearby or on the heating device (3) and configured to detect a temperature of a surface of the heating device (3); and a controller (5) configured to control operation of the heating device (3) based on the temperature of the surface of the heating device (3) detected by the first temperature sensing device (4). The air-based fryer reduces the generation of fume by restricting the surface temperature of the heating device.

21 Claims, 1 Drawing Sheet

(58) Field of Classification Search
USPC .................. 99/476, 474; 126/21 A; 219/400
See application file for complete search history.

(56) References Cited

U.S. PATENT DOCUMENTS

| | | | |
|---|---|---|---|
| 2010/0282097 A1* | 11/2010 | Schulte | ............... F24C 15/2042 |
| | | | 99/476 |
| 2011/0146653 A1 | 6/2011 | Kitatani | |
| 2016/0113442 A1 | 4/2016 | De Haas | |
| 2018/0255971 A1* | 9/2018 | Moon | ..................... A47J 36/00 |

FOREIGN PATENT DOCUMENTS

| | | |
|---|---|---|
| CN | 203000608 U | 6/2013 |
| CN | 203302847 U | 11/2013 |
| CN | 103908166 A | 7/2014 |
| CN | 203970170 U | 12/2014 |
| CN | 104770418 A | 7/2015 |
| CN | 205963849 U | 2/2017 |
| GB | 2460408 A | 12/2009 |
| KR | 20130089449 A | 8/2013 |
| KR | 20130118563 A | 10/2013 |
| WO | 2015176973 A1 | 11/2015 |

\* cited by examiner

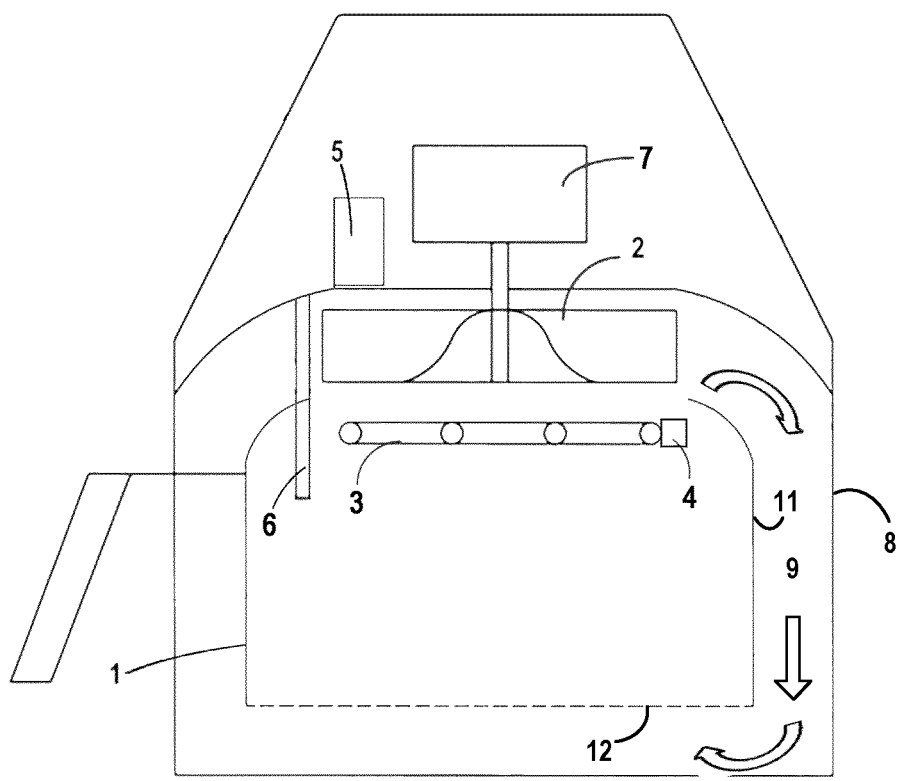

AIR-BASED FRYER

This application is the U.S. National Phase application under 35 U.S.C. § 371 of International Application No. PCT/EP2017/061679, filed on May 16, 2017, which claims the benefit of Chinese Patent Application No. 201620480320.6 filed on May 24, 2016. These applications are hereby incorporated by reference herein.

FIELD

Embodiments of the present disclosure relate to a food producing devices, and particularly to an air-based fryer.

BACKGROUND

An air-based fryer is an appliance capable of using hot air to cook, e.g. fry food. The air-based fryer enables hot air to flow over the food to increase heat transfer to the food and thereby reduce the cooking duration. Prevalence of the air-based fryer in the market benefits from its capability of preparing food with much less oil as compared with a conventional oil fryer. However, the traditional air-based fryers still cause fume during use, particularly when fatty food is cooked at a temperature of above 140 centigrade degrees.

The cooking fume is one of the main drawbacks of the air-based fryer, as it contains tiny particles that pollute the air, and therefore causes long-lasting unpleasant fume smell. In addition, the cooking fume caused by the air-based fryer may further trigger an alarm of a fume detector or an air purifier. The generation of fume has become a main reason for non-technical returns and negative evaluations of the air-based fryer products.

A solution for reducing the smoke caused by the air-based fryer has been proposed. However, this solution has many defects, which will be analyzed in details in the following text, and fails to achieve satisfactory results in many regards, such as function, structure, operation, costs and so on. Therefore, an improved air-based fryer capable of effectively dealing with the cooking fume is required.

SUMMARY

According to some embodiments of the present invention, there is provided an air-based fryer, comprising: a food preparation chamber; a heating device; an airflow generating device configured to enable air heated by the heating device to form an airflow to heat food in the food preparation chamber; a first temperature sensing device located nearby or on the heating device and configured to detect a temperature of a surface of the heating device; and a controller configured to control operation of the heating device based on the temperature of the surface of the heating device detected by the first temperature sensing device.

In some embodiments, the controller is configured to control power of the heating device based on the temperature of the surface of the heating device detected by the first temperature sensing device, to enable the temperature of the surface of the heating device below a predetermined surface temperature value, wherein the predetermined surface temperature value is equal to or lower than a smoke point temperature of the food to be prepared.

In some embodiments, the air-based fryer further comprises a second temperature sensing device configured to detect a temperature of airflow for heating food in the food preparation chamber.

In some embodiments, the controller is configured to control operation of the heating device based on the temperature of the surface of the heating device detected by the first temperature sensing device and the temperature of the airflow detected by the second temperature sensing device.

In some embodiments, the controller is configured to be able to operate in a smokeless mode in which the controller activates the heating device only when the temperature of the surface of the heating device detected by the first temperature sensing device is lower than the predetermined surface temperature value while the temperature of the airflow detected by the second temperature sensing device is lower than a predetermined airflow temperature value.

In some embodiments, the controller is configured to be able to operate in an ordinary mode in which the controller activates the heating device as long as the temperature of the airflow detected by the second temperature sensing device is lower than the predetermined airflow temperature value.

In some embodiments, the controller is configured to be able to operate in a cold-activated mode in the smokeless mode, and in the cold-activated mode, within a predetermined time period from start of the operation of the air-based fryer, the controller controls the heating device by neglecting the temperature of the surface of the heating device detected by the first temperature sensing device.

In some embodiments, at least one of the following values is pre-stored in the the controller for different food types and/or food amounts: a predetermined surface temperature value, a predetermined airflow temperature value, a predetermined time period to operate in the cold-activated mode.

In some embodiments, the air-based fryer further comprises a user interface to enable a user to set at least one of the predetermined surface temperature value, the predetermined airflow temperature value, food type and food amount.

In some embodiments, the user interface allows a user to select a mode at least from the smokeless mode, the ordinary mode and the cold-activated mode.

In some embodiments, the air-based fryer further comprises a housing, in which the food preparation chamber is located, the food preparation chamber having a sidewall and an air-permeable bottom, and an air flow passageway being formed between the sidewall of the food preparation chamber and the housing; wherein the airflow generating device is configured to enable the airflow to circulate between an interior of the food preparation chamber and the air flow passageway through the air-permeable bottom of the food preparation chamber.

By controlling the surface temperature of the heating device to be lower than the smoke point of the cooked food, the air-based fryer according to various embodiments of the present invention may reduce or even eliminate the generation of fume during the use of the air-based fryer in a simple and effective way without increasing structural complexity, design difficulty and manufacturing costs of the air-based fryer. Besides, the simple structure would not increase the possibility of failure occurrence. Furthermore, while effectively dealing with the fume, the proposed air-based fryer can also improve user friendliness of the air-based fryer, and can still support various cooking methods of the air-based fryer. Therefore, the air-based fryer can satisfy different needs of users by providing a selection of operation modes and the air-based fryer can provide optimal operation parameters matching with different food types and food amounts by offering a user interface for the users to set an operation.

BRIEF DESCRIPTION OF THE DRAWINGS

The above and other objectives and characteristics of the present invention will be made more apparent in combination with the following detailed description of the FIGURES, wherein:

FIG. 1 is a schematic view of an air-based fryer according to embodiments of the present invention.

The same reference signs will be understood as designating the same, like or corresponding features or functions.

DETAILED DESCRIPTION OF EMBODIMENTS

Now reference is made to embodiments of the present disclosure. These embodiments are not intended to limit the present disclosure. For example, features shown or described as a portion of an embodiment might be used in another embodiment to generate further embodiments. The present disclosure is intended to include these and other modification and variations falling within the scope and spirit of the present disclosure.

To cope with the fume of the air-based fryer, some solutions use a quick cleaning basket with a cap to try to alleviate the problem. However, by blocking radiation, the air-based fryer may become incapable of three-dimensional baking, coloring and popcorn cooking and so on. Besides, the visual control over the food during cooking is also compromised. The need of a high-temperature-resistant cap raises the costs and correspondingly increases the structural complexity and possibility of failure. In order to effectively cope with the fume issue of the fryer and overcome the above and other potential problems in the traditional solution, the embodiments of the present invention proposes a new air-based fryer.

FIG. 1 shows a schematic diagram of an air-based fryer according to embodiments of the present disclosure. As indicated in the FIGURE, the air-based fryer generally comprises a housing 8, a food preparation chamber 1 within the housing 8, an airflow generating device 2 and a heating device 3.

The food preparation chamber 1 has a sidewall 11 and a bottom 12. The bottom 12 is advantageously made of an air-permeable structure, e.g. a web. The food preparation chamber 1 is used for holding food to be cooked. In one embodiment, the airflow generating device 2 may be a fan disposed at a center of the top of the food preparation chamber 1 and driven by a motor (not shown). It is certain that any other device capable of causing air to flow can serve as the airflow generating device 2. The airflow generating device 2 moves the air within the food preparation chamber 1 to generate airflow. The heating device 3 comprises a resistance heater for example, or may comprise any other types of heating devices. In operation, the heating device 3 may heat the airflow generated by the airflow generating device 2, such that the heated airflow may heat the food to be cooked while flowing through the food in the food preparation chamber 1.

In one embodiment, the airflow generating device 2 pumps air towards the top of the food preparation chamber 1, and the air, after reaching the top of the food preparation chamber 1, moves along a top wall of the food preparation chamber 1 towards the direction of sidewalls of the food preparation chamber 1. There may be a space between the sidewall 11 of the food preparation chamber 1 and the housing 8 to form an air flow passageway 9. The air then moves along the air flow passageway 9 between the sidewall 11 and the housing 8 downwards the food preparation chamber 1, and then converges at a center of the bottom of the food preparation chamber 1 and then passes through the bottom 12 of the food preparation chamber 1 and is pumped upwardly again by the fan into the food preparation chamber 1. In this way, an air circulation represented by the arrows in FIG. 1 is generated between interior of the food preparation chamber 1 and the air flow passageway 9, which facilitates improving the heating effect of the heat airflow on the food within the food preparation chamber 1.

The heating device 3 may be disposed below the airflow generating device 2. When air is being pumped upwardly by the airflow generating device 2, air is first heated by the heating device 3 below the airflow generating device 2. The heated air re-circulates over food in the food preparation chamber 1 to transfer the heat to the food to cook the food.

A first temperature sensing device 4 may be disposed in the vicinity of the heating device 3 or directly on the heating device 3. The first temperature sensing device 4 is used for detecting temperature of a surface of the heating device 3. Furthermore, a second temperature sensing device 6 may also be disposed in the food preparation chamber 1 or at any position where the airflow for heating the food passes by (for example, in the air flow passageway 9), to detect temperature of the airflow for heating the food in the food preparation chamber 1.

The air-based fryer further comprises a controller 5, which controls the operations of the heating device 3 to appropriately cook the food in the food preparation chamber 1. Usually, the air-based fryer controls the operations of the heating device 3 based on a predefined heating profile, which is normally determined by factors such as the food type and/or food amount to be cooked, so as to set the optimal heating parameters for the specific cooking object. The heating profile may comprise airflow temperature values over time, or power values of the heating device 3 over time, as long as it can reflect the control over the airflow temperature for heating the food specific to different phases of cooking the food. In the presence of the second temperature sensing device 6, the controller 5 may receive a signal detected by the second temperature sensing device 6 for reflecting the airflow temperature, and may control the operations of the heating device 3 based on the airflow temperature values fed back by the second temperature sensing device 6, such that the current airflow temperature conforms to the predefined heating profile.

To control the fume generation during cooking, the controller 5 also controls the operations of the heating device 3 based on the temperature of the surface of the heating device detected by the first temperature sensing device 4. Specifically speaking, in the operation process of the air-based fryer, the fume is generated when the small oil/fat droplets carried by the airflow directly contact the heating device 3 with rather high-temperature (higher than the smoke point temperature of the oil/fat droplet and also higher than the temperature of the airflow). Therefore, if the temperature of the surface of the heating device 3 is controlled below the smoke point of the food during the operation process of the air-based fryer, the generation of fume would be reduced or even eliminated.

To this end, according to one embodiment of the invention, a predetermined surface temperature value equal to or below the smoke point of the food to be heated may be set for the heating device 3. The controller 5 receives a signal detected by the first temperature sensing device 4, which signal reflects the temperature of the surface of the heating device 3. Thus, the controller 5 may control the operation of the heating device 3 based on the surface temperature. For example, if the surface temperature of the heating device 3 detected by the first temperature sensing device 4 is higher than the predetermined surface temperature value, the controller 5 reduces the power of the heating device 3 or even turns off the heating device 3, such that the surface temperature of the heating device 3 correspondingly decreases. In response to the surface temperature of the heating device 3 reducing below the predetermined surface temperature value, the controller 5 may increase the power of the heating device 3 or turn on the heating device 3 again. By limiting the surface temperature of the heating device 3 constantly below the smoke point of the food, even if the oil droplets directly contact the surface of the heating device 3 during the cooking process, the temperature of the surface of the heating device 3 will be insufficient to turn the oil droplets into fume. Therefore, the generation of fume is reduced or even eliminated.

In the embodiment having both the first temperature sensing device 4 and the second temperature sensing device 6, the controller 5 may control the operation of the heating device 3 based on both the temperature of the surface of the heating device 3 detected by the first temperature sensing device 4 and the temperature of the airflow detected by the second temperature sensing device 6. For example, in some embodiments, the controller 5 firstly determines whether or not the temperature of the surface of the heating device 3 detected by the first temperature sensing device 4 is below the predetermined surface temperature value. If the temperature of the surface of the heating device 3 is not below the predetermined surface temperature value, the heating device 3 is directly turned off. If the temperature of the surface of the heating device 3 is below the predetermined surface temperature value, the controller 5 further determines whether or not the temperature of the airflow detected by the second temperature sensing device 6 is below a predetermined airflow temperature value associated with the heating profile. If the current temperature of the airflow is not below the predetermined airflow temperature value, it means that the airflow for heating food has reached the predetermined temperature required by the heating profile. At this time, there is no need for the heating device 3 to continue to work. Thus, the controller 5 may turn off the heating device 3 to stop heating the airflow. By contrast, if the current temperature of the airflow is still below the predetermined airflow temperature value, the heating device 3 may be turned on to heat the airflow so as to enable the airflow reaching the predetermined temperature required by the heating profile, such that the food is heated according to the predetermined temperature.

In the above control method of controller 5 for the heating device 3, because the surface temperature of the heating device 3 is restricted, the time period for heating the food may be a bit longer than the case in which the surface temperature of the heating device 3 is not restricted. Therefore, the air-based fryer may provide different operation modes optional for the users, such that users may select between functions of quick cooking and fume eliminating. For example, some cooking cases like frying chips will hardly generate any fume, so there is no need to restrict the surface temperature of the heating device 3 for these cases. Thus, the air-based fryer may provide a user interface for the users to select the smokeless mode or the ordinary mode as required.

In the smokeless mode, as described above, the controller may turn on the heating device 3 only when the temperature of the surface of the heating device 3 detected by the first temperature sensing device 4 is below the predetermined surface temperature value and the temperature of the airflow detected by the second temperature sensing device 6 is below the predetermined airflow temperature value. In another aspect, in the ordinary mode, the controller 5 may take no account of the surface temperature of the heating device 3. In this case, the controller may turn on the heating device 3 as long as the temperature of the airflow detected by the second temperature sensing device 6 is below the predetermined airflow temperature value.

It will be understood that the temperature of the food in the food preparation chamber 1 is typically low at the start phase of operation of the air-based fryer. Therefore, any grease in the food will hardly spill in the air at this time and the airflow will almost carry no oil droplet. Thus, even if the surface temperature of the heating device 3 exceeds the smoke point, it may hardly generate fumes during said start phase. To accelerate the cooking speed in the smokeless mode, the restriction of the surface temperature of the heating device 3 may not be selected during the start phase of heating, such that the temperature of the airflow can rapidly climb up to the predetermined airflow temperature value. To this end, in some embodiments, when the smokeless mode is selected, the air-based fryer can also have a cold-activated mode, in which the controller 5 can control the heating device 3 irrespective of the temperature of the surface of the heating device 3 detected by the first temperature sensing device 4 within a predetermined time period from the start of the operation of the air-based fryer. After the cold-activated mode is finished, when the food temperature is sufficiently high, the controller 5 starts to consider the surface temperature of the heating device 3 and control the operations of the heating device 3 according to the control logic of the smokeless mode as described in the above.

The user interface can provide options for the users, allowing the users to further select the cold-activated mode after having selected the smokeless mode. Furthermore, it can also be understood that the food type and/or food amount in the food preparation chamber 1 can influence the speed of grease spill from food. For example, the speed of grease spill from the food having less grease may be slower, and a larger amount of food may take a longer time to reach the temperature for grease spill. Therefore, the user interface can also support the users to set the predetermined time duration for the cold-activated mode, such that the selected predetermined time duration matches the food type and/or food amount to be cooked.

For example, in some embodiments, the controller 5 can pre-store the respective time duration for the cold-activated mode for different food types and/or food amounts. The user interface may correspondingly provide options for food types and food amounts. When the user selects a specific food type and food amount, the controller 5 can automatically invoke the pre-stored predetermined time duration for the cold-activated mode corresponding to the selected food type and food amount. As an alternative, the controller 5 may also automatically compute the predetermined time duration for the cold-activated mode based on the food type and food amount selected by the user. In this way, the user does not need to pay attention to the specific control parameters for different food types and food amounts, and may obtain the optimal control parameter(s) matching the selected food type and food amount by simply selecting the appropriate food type and food amount.

Furthermore, the smoke point temperature for different food types may vary. In consideration of this, in some embodiments, different predetermined surface temperature values may be set dependent on various food types, such that the controller 5 may match the control over the surface temperature of the heating device 3 with the heated food type. The different predetermined surface temperature values may also be pre-stored in the controller 5 and users may select through the user interface a specific food type to apply the corresponding pre-stored predetermined surface temperature value.

Alternatively or additionally, in some embodiments, the controller 5 may also pre-store the predetermined airflow temperature values for different food types and/or different food amounts, to adapt to different heating airflow temperatures (or heating profiles) required by different food types and/or food amounts. Via the user interface, a user may set a corresponding predetermined airflow temperature value for different food types and/or food amounts, e.g., according to the corresponding mapping between food type, food amount and respective predetermined airflow temperature value.

In the optional embodiments described above, the air-based fryer may self-adaptively control various parameters in cooking modes and/or cooking based on different food types or food amount, to take into account both fume control and cooking effects.

It should be appreciated that the above embodiments illustrate the principle of the present disclosure, but is not intended to limit the scope of the present disclosure; and it should be appreciated by those skilled in the art that medications and variations may be adopted without departing from the spirit and scope of the present disclosure. These modifications and variations are considered in the scope of the present disclosure and the appended claims. The protection scope of the present disclosure is defined by the appended claims. In addition, any reference sign in claims should not be construed as limiting the claims. Use of the verb "comprise" and its variants does not exclude existence of elements or steps besides those recited in claims. The indefinite articles "a" or "an" preceding an element or step does not exclude existence of a plurality of such elements.

What is claimed is:

1. An air-based fryer, comprising:
    a food preparation chamber;
    a heating device;
    an airflow generating device configured to enable air heated by the heating device to form an airflow to heat food in the food preparation chamber;
    a first temperature sensing device located on the heating device and configured to detect a temperature of a surface of the heating device;
    a second temperature sensing device configured to detect a temperature of the airflow for heating the food in the food preparation chamber; and
    a controller configured to: control operation of the heating device based on the temperature of the surface of the heating device detected by the first temperature sensing device and the temperature of the airflow detected by the second temperature sensing device; control power of the heating device based on the temperature of the surface of the heating device detected by the first temperature sensing device; and cause the temperature of the surface of the heating device to be below a predetermined surface value, which is equal to or lower than a smoke point temperature of the food to be prepared,
    wherein the controller is further configured to: determine whether or not the temperature of the surface of the heating device detected by the first temperature sensing device is below the predetermined surface temperature value; and when the temperature of the surface of the heating device is below the predetermined surface temperature value, determine whether or not the temperature of the airflow detected by the second temperature sensing device is below the predetermined airflow temperature value associated with a heating profile.

2. The air-based fryer according to claim 1, wherein the controller is configured to operate in an ordinary mode in which the controller activates the heating device as long as the temperature of the airflow detected by the second temperature sensing device is lower than the predetermined airflow temperature value.

3. The air-based fryer according to claim 1, wherein the controller is configured to operate in a smokeless mode in which the controller activates the heating device only when the temperature of the surface of the heating device detected by the first temperature sensing device is lower than the predetermined surface temperature value while the temperature of the airflow detected by the second temperature sensing device is lower than the predetermined airflow temperature value.

4. The air-based fryer according to claim 3, wherein the controller is configured to operate in a cold-activated mode in the smokeless mode, and in the cold-activated mode, within a predetermined time period from start of the operation of the air-based fryer, the controller controls the heating device by neglecting the temperature of the surface of the heating device detected by the first temperature sensing device.

5. The air-based fryer according to claim 1, wherein at least one quantity of the following is pre-stored in the controller for different food types and/or food amounts: the predetermined surface temperature value, the predetermined airflow temperature value, and a predetermined time period.

6. The air-based fryer according to claim 1, further comprising a user interface to allow a user to set at least one of: the predetermined surface temperature value, the predetermined airflow temperature value, food type, and food amount.

7. The air-based fryer according to claim 2, further comprising a user interface to allow a user to select a mode at least from a smokeless mode, the ordinary mode, and a cold-activated mode.

8. The air-based fryer according to claim 1, wherein the controller is further configured to: determine whether or not the temperature of the surface of the heating device detected by the first temperature sensing device is below the predetermined surface temperature value; and when the temperature of the surface of the heating device is not below the predetermined surface temperature value, turn off the heating device.

9. The air-based fryer according to claim 1, wherein the controller is further configured to: determine whether or not the temperature of the surface of the heating device detected by the first temperature sensing device is below the predetermined surface temperature value; and when the temperature of the airflow is not below the predetermined airflow temperature value, turn off the heating device to stop heating the airflow.

10. An air-based fryer, comprising:
    a food preparation chamber;
    a heating device;
    an airflow generating device configured to cause air heated by the heating device to form an airflow to heat food in the food preparation chamber;

a first temperature sensing device located on the heating device and configured to detect a temperature of a surface of the heating device;
a second temperature sensing device configured to detect a temperature of the airflow for heating the food in the food preparation chamber; and
a controller configured to: control operation of the heating device based on the temperature of the surface of the heating device detected by the first temperature sensing device and the temperature of the airflow detected by the second temperature sensing device; control power of the heating device based on the temperature of the surface of the heating device detected by the first temperature sensing device; and cause the termperature of the surface of the heating device to be below a predetmined surface temperature value, which is equal to or lower than a smoke point temperature of the food to be prepeared,
wherein the controller is further configured to: determine whether or not the temperature of the surface of the heating device detected by the first temperature sensing device is below the predetermined surface temperature value; and when a current temperature of the airflow is below a predetermined airflow temperature value, turn on the heating device to heat the airflow so the airflow reaches a predetermined airflow temperature required by a heating profile, and the food is heated according to the predetermined temperature.

11. An air-based fryer, comprising:
a food preparation chamber;
a heating device;
an airflow generating device configured to cause air heated by the heating device to form an airflow to heat food in the food preparation chamber;
a housing in which the food preparation chamber is disposed, the housing comprising: a sidewall; an air flow passageway being formed between the sidewall of the food preparation chamber and the housing; and an air-permeable bottom, wherein the airflow generating device is configured to cause the airflow to circulate between an interior of the food preparation chamber and the air flow passageway through the air-permeable bottom of the food preparation chamber;
a first temperature sensing device located on the heating device and configured to detect a temperature of a surface of the heating device; and
a controller configured to: control operation of the heating device based on the temperature of the surface of the heating device detected by the first temperature sensing device and the temperature of the airflow detected by the second temperature sensing device; control power of the heating device based on the temperature of the surface of the heating device detected by the first temperature sensing device; and cause the temperature of the surface of the heating device to be below a predetermined surface temperature value, which is equal to or lower than a smoke point temperature of the food to be prepeared.

12. The air-based fryer according to claim 11, wherein the controller is configured to operate in an ordinary mode in which the controller activates the heating device as long as the temperature of the airflow detected by the second temperature sensing device is lower than a predetermined airflow temperature value.

13. The air-based fryer according to claim 11, wherein the controller is configured to operate in a smokeless mode in which the controller activates the heating device only when the temperature of the surface of the heating device detected by the first temperature sensing device is lower than the predetermined surface temperature value while the temperature of the airflow detected by the second temperature sensing device is lower than a predetermined airflow temperature value.

14. The air-based fryer according to claim 13, wherein the controller is configured to be operable in a cold-activated mode in the smokeless mode, and in the cold-activated mode, within a predetermined time period from start of the operation of the air-based fryer, the controller controls the heating device by neglecting the temperature of the surface of the heating device detected by the first temperature sensing device.

15. The air-based fryer according to claim 11, wherein at least one quanitity of the following is pre-stored in the controller for different food types and/or food amounts: the predetermined surface temperature value, a predetermined airflow temperature value, and a predetermined time period.

16. The air-based fryer according to claim 11, further comprising a user interface to allow a user to set at least one of: the predetermined surface temperature value, a predetermined airflow temperature value, food type, and food amount.

17. The air-based fryer according to claim 13, further comprising a user interface to allow a user to select a mode at least from the smokeless mode, an ordinary mode, and a cold-activated mode.

18. The air-based fryer according to claim 11, wherein the controller is further configured to: determine whether or not the temperature of the surface of the heating device detected by the first temperature sensing device is below the predetermined surface temperature value; and when the temperature of the surface of the heating device is not below the predetermined surface temperature value, turn off the heating device.

19. The air-based fryer according to claim 11, wherein the controller is further configured to: determine whether or not the temperature of the surface of the heating device detected by the first temperature sensing device is below the predetermined surface temperature value; and when the temperature of the surface of the heating device is below the predetermined surface temperature value, determine whether or not the temperature of the airflow detected by the second temperature sensing device is below a predetermined airflow temperature value associated with a heating profile.

20. The air-based fryer according to claim 11, wherein the controller is further configured to: determine whether or not the temperature of the surface of the heating device detected by the first temperature sensing device is below the predetermined surface temperature value; and when the temperature of airflow is not below a predetermined airflow temperature value, turn off the heating device to stop heating the airflow.

21. The air-based fryer according to claim 11, wherein the controller is further configured to: determine whether or not the temperature of the surface of the heating device detected by the first temperature sensing device is below the predetermined surface temperature value; and when the temperature of airflow is below a predetermined airflow temperature value, turn on the heating device to heat the airflow so the airflow reaches a predetermined temperature required by a heating profile, and the food is heated according to the predetermined temperature.

* * * * *